US012681816B2

(12) United States Patent
Cohn et al.

(10) Patent No.: US 12,681,816 B2
(45) Date of Patent: Jul. 14, 2026

(54) REPLICATING DATA WITH A DATA ORCHESTRATOR

(71) Applicant: INTERNATIONAL BUSINESS MACHINES CORPORATION, Armonk, NY (US)

(72) Inventors: Jeremy Andrew Cohn, Tucson, AZ (US); Marc Eshel, Santa Clara, CA (US); Frank Schmuck, Campbell, CA (US); Vasily Tarasov, Moorpark, CA (US); Lei Pan, Mountain View, CA (US); D Scott Guthridge, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 18/583,646

(22) Filed: Feb. 21, 2024

(65) Prior Publication Data

US 2025/0265160 A1 Aug. 21, 2025

(51) Int. Cl.
| | |
|---|---|
| *G06F 11/00* | (2006.01) |
| *G06F 11/1446* | (2026.01) |
| *G06F 11/20* | (2006.01) |

(52) U.S. Cl.
CPC ...... *G06F 11/2082* (2013.01); *G06F 11/1461* (2013.01); *G06F 11/2064* (2013.01)

(58) Field of Classification Search
CPC .. G06F 11/2028; G06F 16/128; G06F 3/0647; G06F 3/0631; G06F 11/1448; G06F 11/1471; G06F 11/1458; G06F 11/2082
See application file for complete search history.

(56) References Cited

U.S. PATENT DOCUMENTS

| | | | | |
|---|---|---|---|---|
| 8,671,406 | B1 * | 3/2014 | Gopal | G06F 9/45533 718/1 |
| 9,535,802 | B2 * | 1/2017 | Tsafrir | G06F 11/1088 |
| 10,061,533 | B1 | 8/2018 | Barcello | |
| 11,474,945 | B2 * | 10/2022 | Jalaparti | G06F 12/0868 |

(Continued)

OTHER PUBLICATIONS

"Automatically Morphing Copy Rules through Policy and Environment," IP.com, IPCOM000182909D, May 8, 2009, 2 pp.

(Continued)

*Primary Examiner* — Loan L.T. Truong
(74) *Attorney, Agent, or Firm* — Konrad, Raynes, Davda & Victor, LLP; Janaki K. Davda

(57) ABSTRACT

Provided are techniques for replicating data with a data orchestrator. A replication request and a policy for an original dataset to be replicated on one or more storage systems as one or more replicated datasets are received. A storage system of the one or more storage systems is selected. It is determined whether a custom storage system plug-in is associated with the storage system based on a storage system type. In response to determining that the custom storage system plug-in is associated with the storage system, the custom storage system plug-in is executed to create a replicated dataset on the storage system. In response to determining that the custom storage system plug-in is not associated with the storage system, a script is generated based on the policy and the script is executed to create the replicated dataset on the storage system.

20 Claims, 16 Drawing Sheets

(56) References Cited

U.S. PATENT DOCUMENTS

| | | | | |
|---|---|---|---|---|
| 11,487,513 | B1 | 11/2022 | Hanson | |
| 11,522,914 | B1 * | 12/2022 | Malamut | H04L 63/20 |
| 11,734,136 | B1 * | 8/2023 | Jain | G06F 11/203 |
| | | | | 714/4.11 |
| 12,248,694 | B2 * | 3/2025 | Nair | G06F 11/1451 |
| 2002/0129106 | A1 * | 9/2002 | Gutfreund | G06Q 10/10 |
| | | | | 715/255 |
| 2021/0240369 | A1 * | 8/2021 | Cain | G06F 3/0679 |
| 2022/0360627 | A1 * | 11/2022 | Vermeulen | G06F 9/547 |
| 2023/0229319 | A1 * | 7/2023 | Klein | G06F 3/0659 |
| | | | | 711/113 |
| 2024/0176799 | A1 * | 5/2024 | Gunda | G06F 16/258 |
| 2024/0289300 | A1 * | 8/2024 | Kavaipatti Anantharamakrishnan | G06F 16/125 |
| 2024/0289308 | A1 * | 8/2024 | Dantale | G06F 16/254 |
| 2025/0110646 | A1 * | 4/2025 | Dong | G06F 3/065 |
| 2025/0232247 | A1 * | 7/2025 | Zhang | G06F 1/3203 |

OTHER PUBLICATIONS

"Data Orchestration", Komprise, 6 pp., [online][retrieved Feb. 9, 2024] https://www.komprise.com/glossary_terms/data-orchestration/.

"Hybrid Cloud Solutions", NetApp, 8 pp., [online][retrieved Feb. 9, 2024] https://www.netapp.com/hybrid-cloud/.

"NetApp BlueXP", NetApp, 13 pp., [online][retrieved Feb. 9, 2024] https://www.netapp.com/bluexp/?utm_campaign=tbnr-mdc-all-na-ww-webc-webp-sitelink-1702640221557&ef_id=ZcbiwAAABIsJdFAU:20240210024316:s.

"NFS Servers and Clients", Oracle, 2010, 1 pp., [online][retrieved Feb. 9, 2024] https://docs.oracle.com/cd/E19683-01/806-4076/rfsintro-5/index.html.

"Overview of IBM Spectrum Scale", IBM Corporation, Mar. 2, 2021, 1 pp., [online][retrieved Feb. 9, 2024] https://www.ibm.com/docs/en/storage-scale/5.0.4?topic=overview-spectrum-scale.

"Overview of Red Hat's Multi Cloud Gateway (Noobaa)", Red Hat, Apr. 22, 2022, 13 pp., [online][retrieved Feb. 9, 2024] https://blog.stderr.at/openshift/2022-04-22-multi-cloud-gateway/.

"Overview", Kubernetes, Sep. 19, 2023, 4 pp., [online][retrieved Feb. 9, 2024] https://kubernetes.io/docs/concepts/overview/.

"Replicating objects", Amazon, 8 pp., [online][retrieved Feb. 9, 2024] https://docs.aws.amazon.com/AmazonS3/latest/userguide/replication.html.

"The Hammerspace Data Orchestration System", Hammerspace, 2024, 8 pp., [online][retrieved Feb. 9, 2024] https://hammerspace.com/the-hammerspace-data-orchestration-system/.

"The Portworx Platform", Portworx, 8 pp., [online][retrieved Feb. 9, 2024] https://portworx.com/platform/.

C. Marinelli, "What is OpenShift? And how to make OpenShift monitoring easy", 16 pp., [online][retrieved Feb. 23, 2023] https://www.dynatrace.com/news/blog/what-is-openshift-2/.

C.P. Smith, et al., "FaDO: FaaS Functions and Data Orchestrator for Multiple Serverless Edge-Cloud Clusters," IEEE, 2022 IEEE 6th International Conference on Fog and Edge Computing (ICFEC), 2022, 9 pp.

G. Newell, "Sysadmin tools: Using rsync to manage backup, restore, and file synchronization", Red Hat, Aug. 12, 2020, 8 pp., [online][retrieved Feb. 9, 2024] https://www.redhat.com/sysadmin/rsync-synchronize-backup-restore.

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. et al., "The NIST Definition of Cloud Computing (Draft)", Sep. 2011, Computer Security Division Information Technology Laboratory National Institute of Standards and Technology, Total 7 pp.

* cited by examiner

100

800

```
{
  # specify the name of the dataset
  name: blue-AI, specify placement & replication rules
  source: S1, target: T1, mode: read-write-prefetch, interval: 15sec,
  source: S1, target: T2, mode: read-write-prefetch, interval: 15sec,
  source: S1, target: T3, mode: read-only-ondemand, interval: 1hr, specify no of replica (full) copies
  replicas: 3, specifies which systems to pin copies
  affinities: {
    hard: [s1, s2], soft: [s3]
  } specify which users (or roles) can access dataset
  security: {
    allowed: [user 123, user xyz], disallowed: [user abc]
  }, specify which regions dataset can live
  governance: {
    allowed: [region-1, region-2], disallowed: [region-X]
  }
}
```

FIG. 8

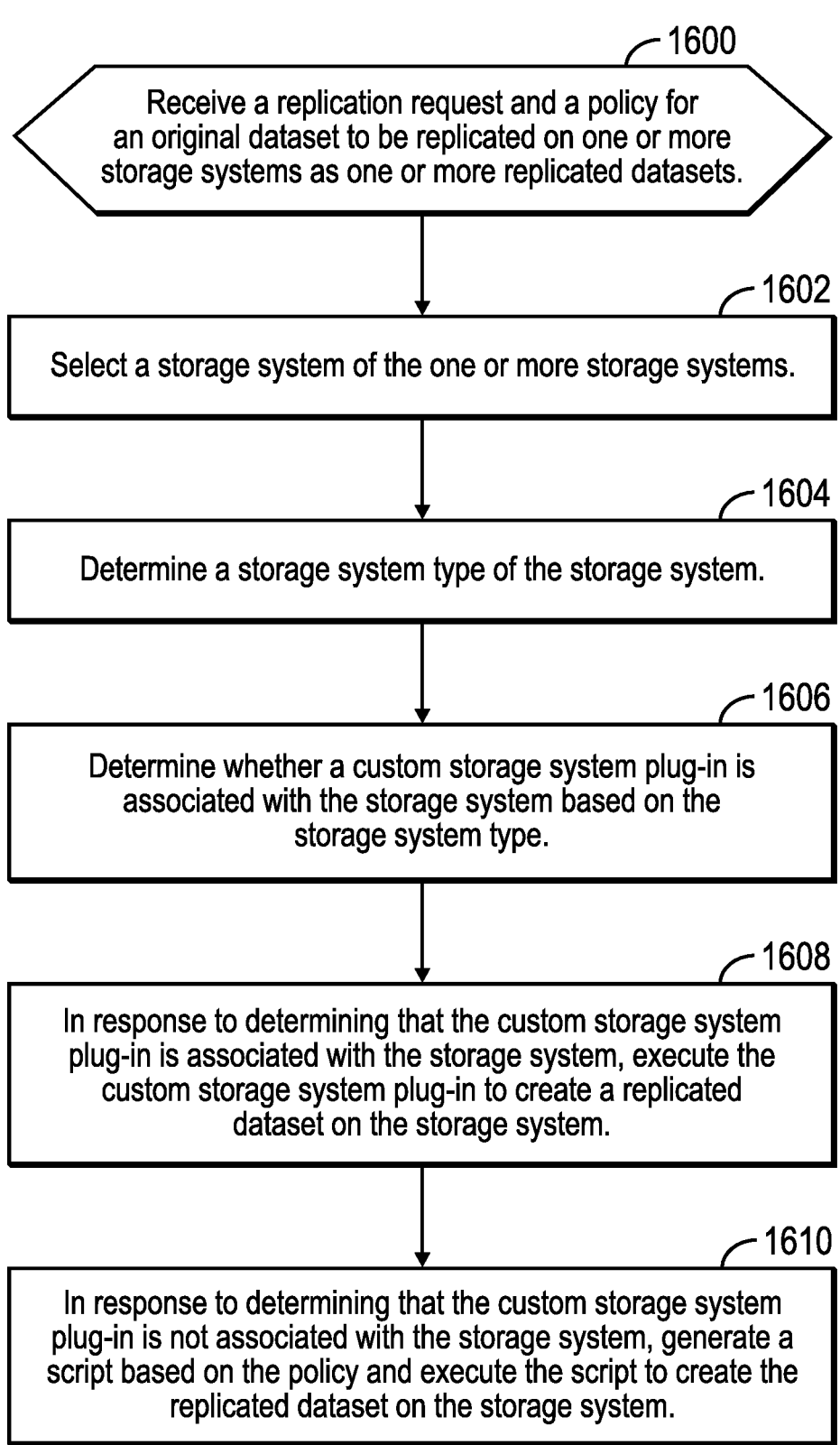

1600

Receive a replication request and a policy for
an original dataset to be replicated on one or more
storage systems as one or more replicated datasets.

1602

Select a storage system of the one or more storage systems.

1604

Determine a storage system type of the storage system.

1606

Determine whether a custom storage system plug-in is
associated with the storage system based on the
storage system type.

1608

In response to determining that the custom storage system
plug-in is associated with the storage system, execute the
custom storage system plug-in to create a replicated
dataset on the storage system.

1610

In response to determining that the custom storage system
plug-in is not associated with the storage system, generate a
script based on the policy and execute the script to create the
replicated dataset on the storage system.

FIG. 16

REPLICATING DATA WITH A DATA ORCHESTRATOR

BACKGROUND

Embodiments of the invention relate to replicating data with a data orchestrator.

Data storage systems are usually designed to provide redundancy of data to reduce the risk of data loss in the event of failure of a component of the data storage system. Thus, multiple copies of data are frequently stored on multiple systems, which may be geographically dispersed. For example, data from a host to be stored in the data storage system is typically directed to a source system at a local site and then replicated to a target system, which may be geographically remote from the source system. Traditional storage systems focus on this point-to-point data replication (i.e., from the source system to the target system).

Setting up data replication workflows between two or more systems is a slow, expensive, and error prone process that is performed by someone with expert knowledge in development/operations (DevOps) or Site Reliability Engineering (SRE). Some systems provide automation scripts, but these systems don't provide a Graphical User Interface (GUI).

Other systems provide data management solutions with a GUI dashboard. However, these other systems may work with proprietary data and storage systems and may still use a manual process for setting up data replication between two storage systems. In the cases of disaster recovery solutions, conventional systems may require a user to specify which two storage systems they want to set up for replicas. Also, the GUI typically provides a singular viewpoint for each system.

Moreover, multi-system management solutions may focus on system fleet management. System fleet management refers to the centralized management of a group of systems, such as servers, workstations, or Internet of Things (IoT) devices, within an organization and involves tasks, such as monitoring, updating, securing, and managing hardware and software resources across the fleet. However, system fleet management does not typically focus on data replication.

SUMMARY

In accordance with certain embodiments, a computer-implemented method comprising operations is provided for replicating data with a data orchestrator. In such embodiments, a replication request and a policy for an original dataset to be replicated on one or more storage systems as one or more replicated datasets are received. A storage system of the one or more storage systems is selected. A storage system type of the storage system is determined. It is determined whether a custom storage system plug-in is associated with the storage system based on the storage system type. In response to determining that the custom storage system plug-in is associated with the storage system, the custom storage system plug-in is executed to create a replicated dataset on the storage system. In response to determining that the custom storage system plug-in is not associated with the storage system, a script is generated based on the policy and the script is executed to create the replicated dataset on the storage system.

In accordance with other embodiments, a computer program product comprising a computer readable storage medium having program code embodied therewith is provided, where the program code is executable by at least one processor to perform operations for replicating data with a data orchestrator. In such embodiments, a replication request and a policy for an original dataset to be replicated on one or more storage systems as one or more replicated datasets are received. A storage system of the one or more storage systems is selected. A storage system type of the storage system is determined. It is determined whether a custom storage system plug-in is associated with the storage system based on the storage system type. In response to determining that the custom storage system plug-in is associated with the storage system, the custom storage system plug-in is executed to create a replicated dataset on the storage system. In response to determining that the custom storage system plug-in is not associated with the storage system, a script is generated based on the policy and the script is executed to create the replicated dataset on the storage system.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for replicating data with a data orchestrator. In such embodiments, a replication request and a policy for an original dataset to be replicated on one or more storage systems as one or more replicated datasets are received. A storage system of the one or more storage systems is selected. A storage system type of the storage system is determined. It is determined whether a custom storage system plug-in is associated with the storage system based on the storage system type. In response to determining that the custom storage system plug-in is associated with the storage system, the custom storage system plug-in is executed to create a replicated dataset on the storage system. In response to determining that the custom storage system plug-in is not associated with the storage system, a script is generated based on the policy and the script is executed to create the replicated dataset on the storage system.

BRIEF DESCRIPTION OF THE DRAWINGS

Referring now to the drawings in which like reference numbers represent corresponding parts throughout:

FIG. 8 illustrates an example policy in accordance with certain embodiments.

FIG. 16 illustrates, in a flowchart, operations by the data orchestrator for replicating data in accordance with certain embodiments.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
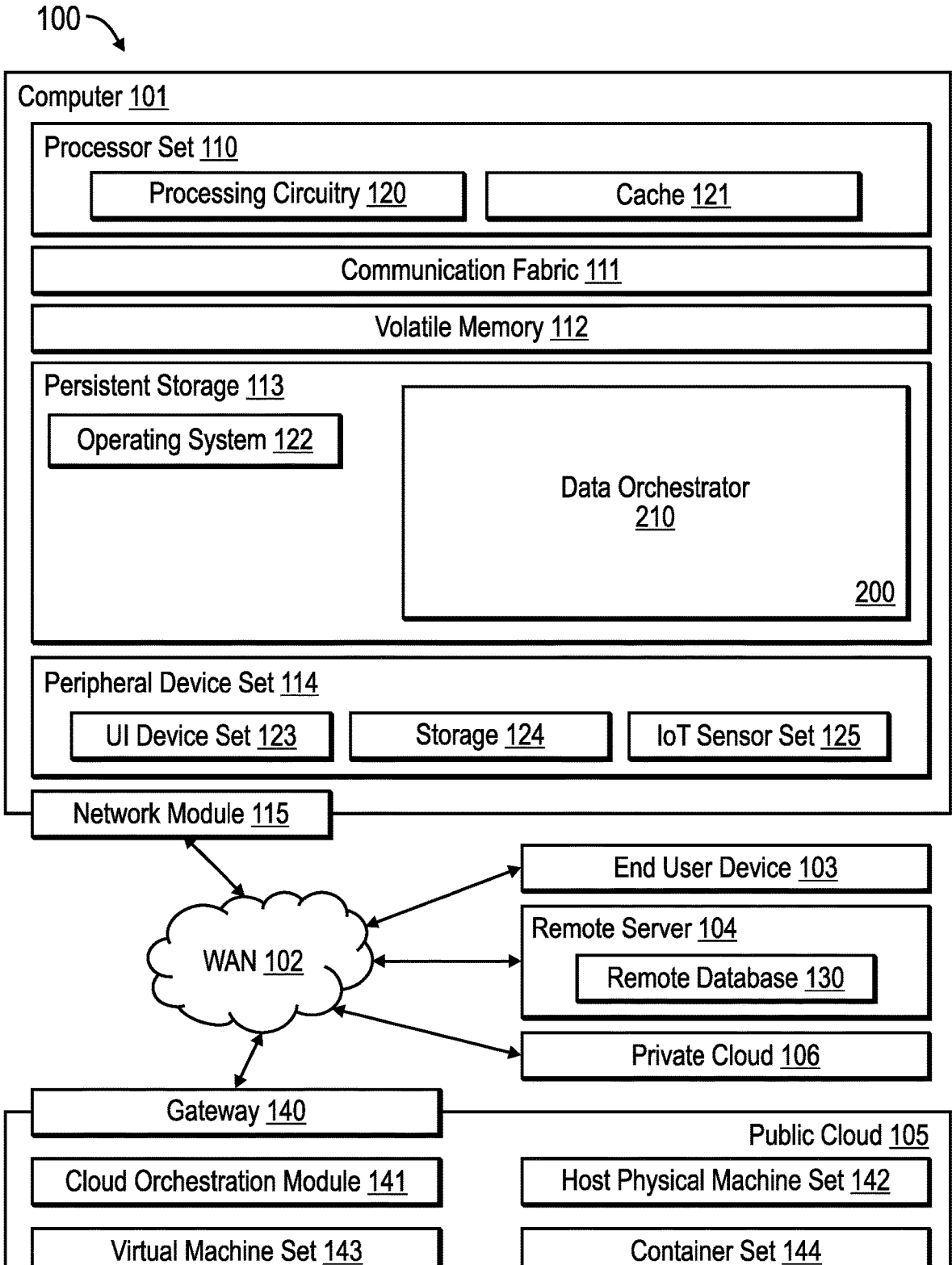
FIG. 1 illustrates a computing environment in accordance with certain embodiments.

Computing environment 100 of FIG. 1 contains an example of an environment for the execution of at least some of the computer code involved in performing the inventive methods, such as a data orchestrator 210 of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
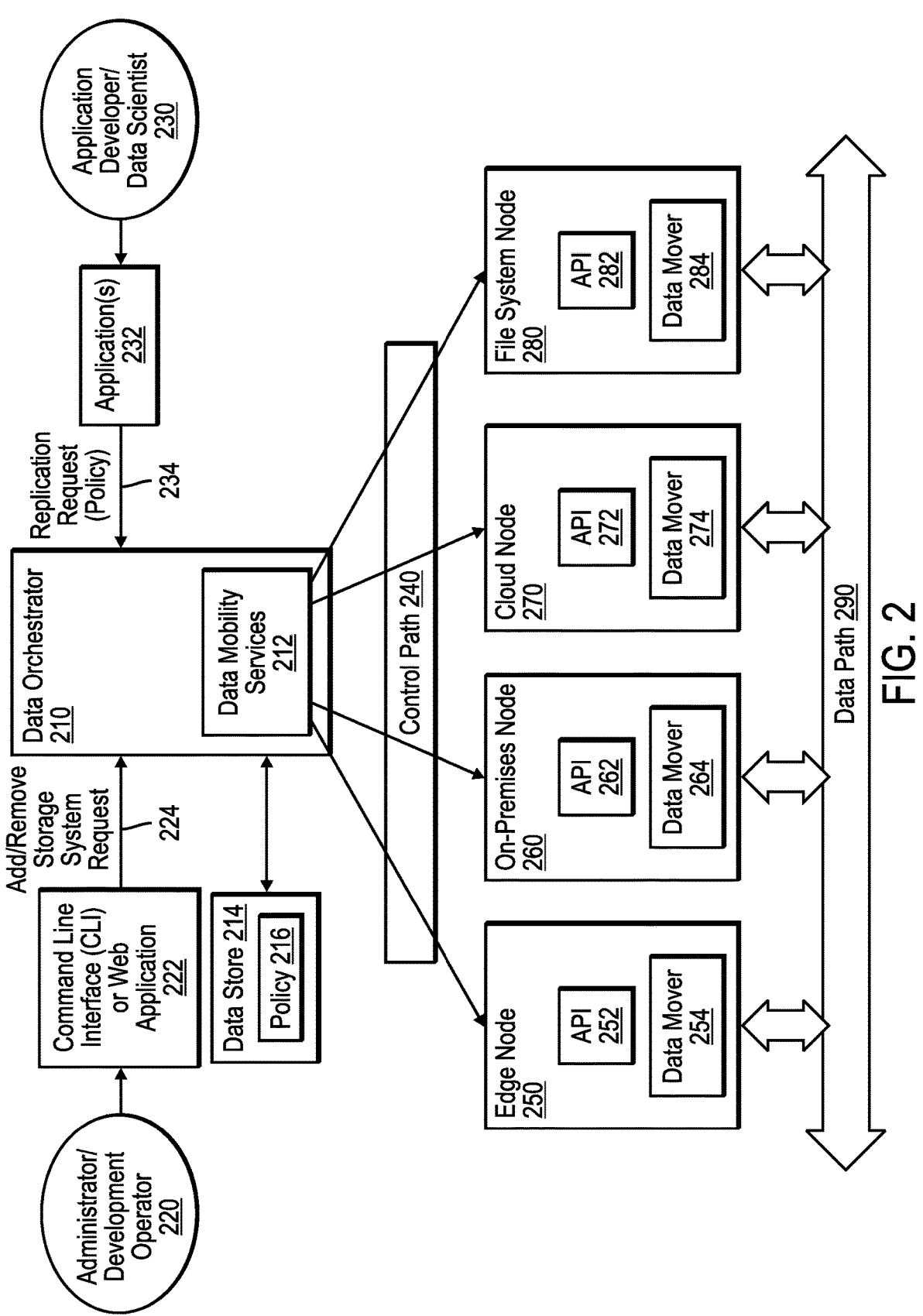
FIG. 2 illustrates a computing environment for a data orchestrator in accordance with certain embodiments.

FIG. 2 illustrates a computing environment for a data orchestrator 210 in accordance with certain embodiments. The data orchestrator 210 includes data mobility services 212 for moving data. An administrator or development operator 220 (i.e., a type of user) adds storage systems (for management by the data orchestrator 210), users, and roles. The administrator or development operator 220 may use a Command Line Interface (CLI), an Application Programming Interface (API) (such as a Representational State Transfer (REST) API), or a WebApp 222 to issue an add/remove storage system request 224 to the data orchestrator 210. The add/remove storage system request 224 identifies the storage system to be added or removed, along with an Internet Protocol (IP) hostname, credentials, location coordinates, whether there is a custom storage system plug-in for the storage system, etc. The storage system may be described as having a storage manager (e.g., for executing instructions to perform replication) and storage devices that store data in volumes. In certain embodiments, the data orchestrator 210 runs on a management server, and the management server has the architecture of computer 101.

An application developer or data scientist 230 (i.e., a type of user) creates original datasets (that may be replicated to form replicated datasets), manages the policy for each dataset (where the policy is created using a declarative policy language), and requests replicated datasets and/or file cache replicas (i.e., copies) of the original dataset. The application developer or data scientist 230 may use one or more applications 232 to issue a replication request 234 to the data orchestrator 210.

In certain embodiments, the administrator or development operator 220 and the application developer or data scientist 230 may use the same interface, but with different roles or permissions on what they can and cannot do.

In certain embodiments, the administrator or development operator 220 is primarily involved with managing which systems the data orchestrator 210 will oversee by adding and removing storage systems. In certain embodiments, the application developer or data scientist 230 is primarily involved with requesting the data orchestrator 210 to manage datasets and replication activity.

An original dataset may be described as a collection of files or objects containing related data. In certain embodiments, the original dataset may exist on any of the nodes 250, 260, 270 or 280. In other embodiments, the original dataset may be stored in the data store 214.

In certain embodiments, a request 224, 234 is a Representational State Transfer (REST) Application Programming Interface (API) request. The replication request 234 includes a policy that describes the replication that is desired. The data orchestrator 210 stores the policy 216 in a data store 214 (e.g., a database).

In the example of FIG. 2, the data orchestrator 210 is connected to an edge node 250, and on-premises ("on-prem") node 260, a cloud node 270, and a file system node 280 via a control path 240. The nodes 250, 260, 270, 280 may also be described as storage systems. The data orchestrator 210 uses the control path 240 to issue replication requests to the nodes 250, 260, 270, 280. The nodes 250, 260, 270, 280 are connected to each other via a data path 290, and the nodes 250, 260, 270, 280 send data to each other over the data path 290 to create a replicated dataset (i.e., a copy of an original dataset). The data orchestrator 210 connects to and monitors each node 250, 260, 270, 280.

The data orchestrator 210 may issue a request to replicate data to the edge node 250 using the API 252, and the data mover 254 moves data from the edge node 250 to one or more other nodes 260, 270, 280.

The data orchestrator 210 may issue a request to replicate data to the on-prem node 260 using the API 262, and the data mover 264 moves data from the on-prem node 260 to one or more other nodes 250, 270, 280.

The data orchestrator 210 may issue a request to replicate data to the cloud node 270 using the API 272, and the data mover 274 moves data from the cloud node 270 to one or more other nodes 250, 260, 280.

The data orchestrator 210 may issue a request to replicate data to the file system node 280 using the API 282, and the data mover 284 moves data from the file system node 280 to one or more other nodes 250, 260, 270.

The data orchestrator 210 and policy 216 enable the ability to setup data replication across many topologies, many storage systems (i.e., nodes), and using many replication modes (e.g., read only mode or read-write mode). The data orchestrator 210 enables configuring (e.g., creating volumes on storage systems) and monitoring and maintaining replicated datasets (i.e., continuous observability, such as determining that a replicated dataset is no longer available and creating another replicated dataset for compliance with the policy) in large edge networks and diverse system architectures (e.g., in a Network File System, a cloud environment, an on-prem system, etc.).

Figure 3:
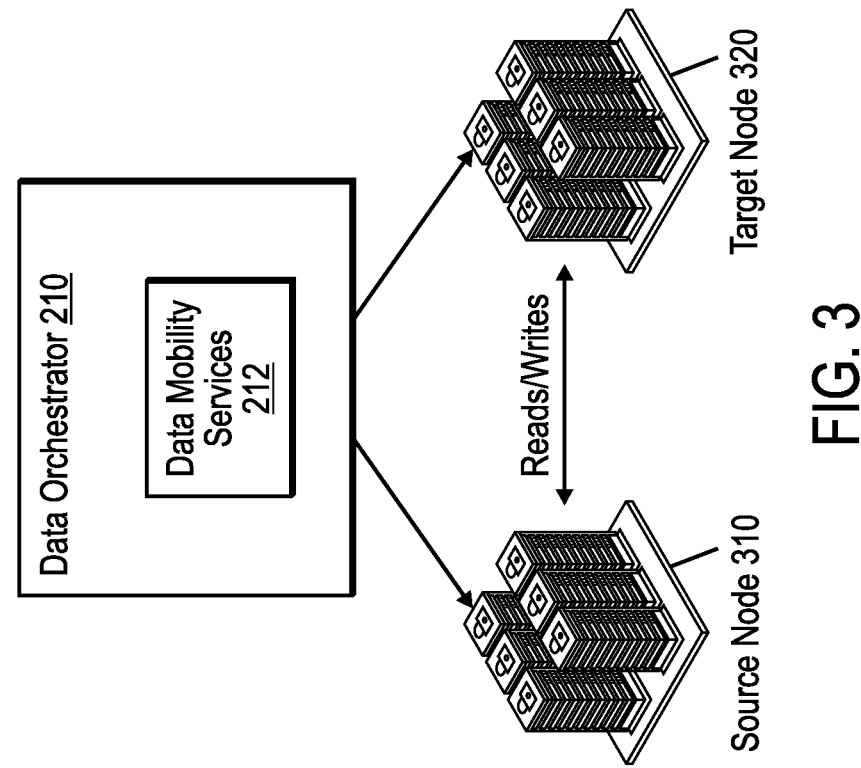
FIG. 3 illustrates a homogenous environment in accordance with certain embodiments.

FIG. 3 illustrates a homogenous environment in accordance with certain embodiments. In FIG. 3, the data orchestrator 210 replicates data between a source node 310 and a target node 320.

Figure 4:
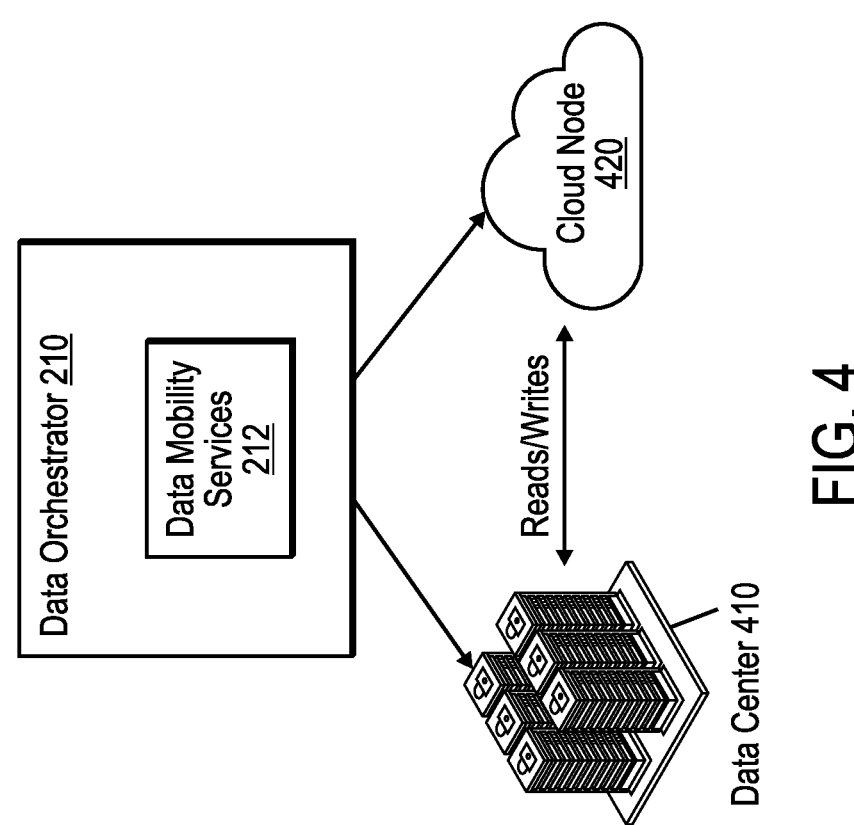
FIG. 4 illustrates a hybrid cloud environment in accordance with certain embodiments.

FIG. 4 illustrates a hybrid cloud environment in accordance with certain embodiments. In FIG. 4, the data orchestrator 210 replicates data between a data center 410 and a cloud node 420.

Figure 5:
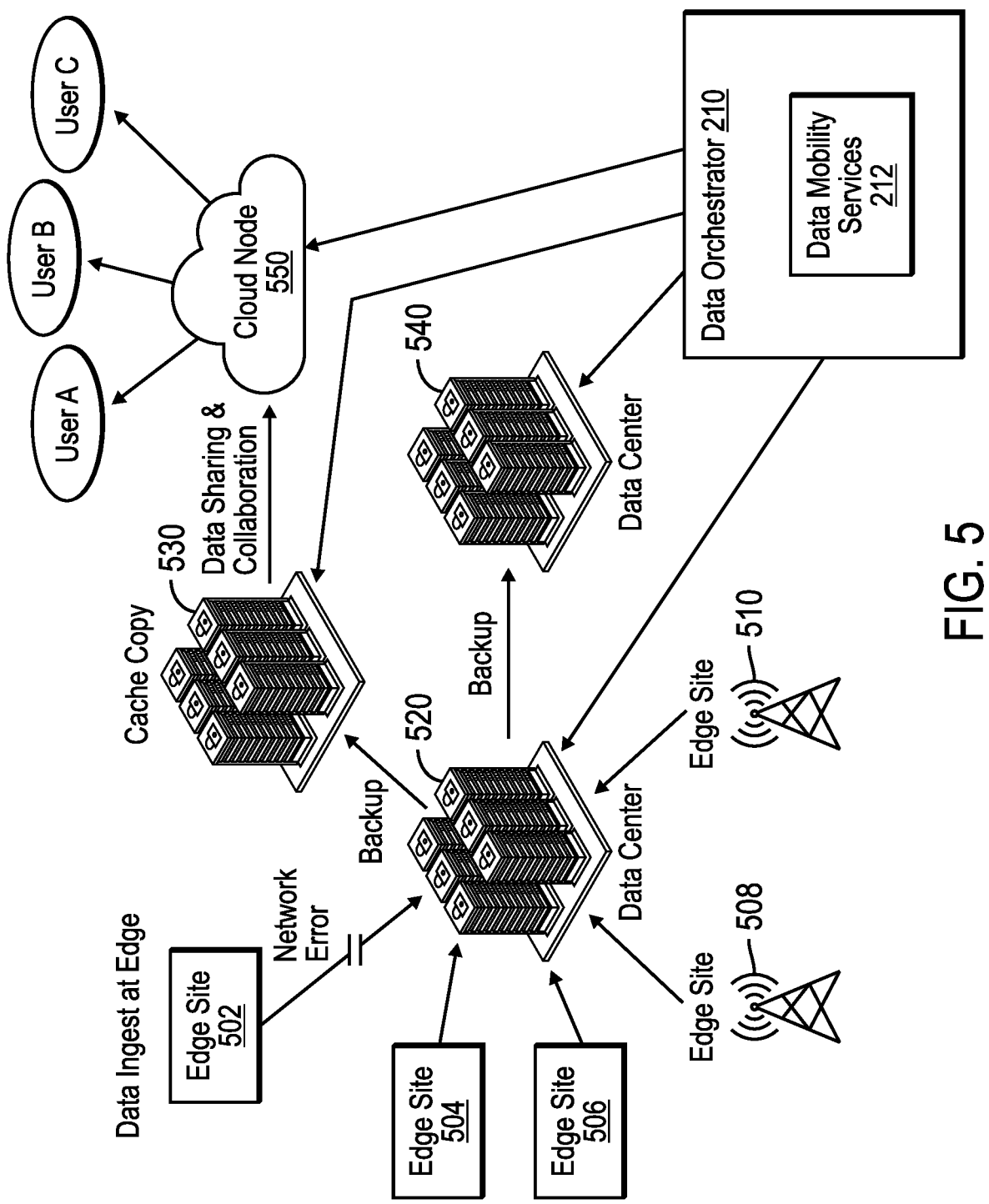
FIG. 5 illustrates an edge topology in accordance with certain embodiments.

FIG. 5 illustrates an edge topology in accordance with certain embodiments. In FIG. 5, edge sites 502, 504, 506, 508, 510 send edge data to a data center 520. The data orchestrator 210 replicates data from the data center 520 to the cache copy 530 and to data center 540. In addition, the data orchestrator 210 replicates data from the cache copy 530 to the cloud node 550 for data sharing and collaboration by User A, User B, and User C.

With embodiments, the data orchestrator 210 implements a policy to replicate data in a homogenous environment, in a hybrid cloud environment and/or in an edge topology.

The policy 216 is created with a predefined policy language (i.e., a declarative policy language) that the data orchestrator 210 recognizes. The policy 216 allows users to express "what" data replication is desired, abstracting away the "how-to", and the data orchestrator 210 performs the replication across multiple storage systems and a diverse set of architectures. In certain embodiments, the data orchestrator 210 is implemented with the command sequences ("how-to") to set up and maintain data replication as expressed by the policy 216.

For example, suppose a user desires to maintain three full replicas of a dataset regardless of failure. The user creates the policy 216 as follows:

```
{
    #Specify no of replica (full) replicas: 3
}
```

The data orchestrator 210 identifies three storage systems (e.g., three of the nodes 250, 260, 270, 280) based on availability and having enough capacity to store the dataset. Once these three storage systems are identified, the data orchestrator 210 creates volumes on the three storage systems using the correct command sequence (i.e., by executing a script having instructions) for each respective architecture. In certain embodiments, the data orchestrator 210 creates the volumes for each replica on the storage systems using the same API or Secure Shell (SSH) interfaces provided by the storage systems.

Then the data orchestrator 210 sets up data replication using an available data replication mechanism provided by the storage systems across the three volumes. If one of the storage systems fails, then the data orchestrator 210 creates a new volume on another available storage system and sets up data replication between the remaining volumes and the new volume so that there are three replicas of the dataset.

With embodiments, the data orchestrator 210 recognizes a declarative policy language that allows users to express the "what" and not the "how" for setting up data replication. The declarative policy language allows users to express policies not specific to any architecture or system (multi-system replication). The policy may be described as providing replication settings.

The data orchestrator 210 implements many replication scenarios, e.g., disaster recovery, caching modes, etc. In addition, the data orchestrator 210 is able to implement many replication topologies (e.g. hub and spoke, replication chaining, mesh, etc.) across a large number of edge systems and data center systems.

The data orchestrator 210 adds and monitors storage systems, interfaces with users via REST APIs and interacts with the storage systems using APIs or scripts for those storage systems. In certain embodiments, a user uses the declarative policy language to create a policy per dataset and to specify desired replication rules. In other embodiments, the user may use the declarative policy language to create a policy per a group of datasets.

In certain embodiments, the data orchestrator 210 includes a custom storage system plug-in to support custom (e.g., lesser-known) storage systems (e.g., custom (i.e., proprietary) storage systems) and to allow for a diverse set of storage systems.

In certain embodiments, a policy includes the name of the original dataset, the size of the original dataset, and a primary storage system. In certain embodiments, the primary storage system identifies the location of an existing, original dataset, while in alternative embodiments, the primary storage system identifies where a new, original dataset is to be stored.

In certain embodiments, once a storage system is added to the data orchestrator 210, the data orchestrator 210 queries the list of the volumes on that storage system. In certain embodiments, those volumes are classified as datasets in a database (a type of data store 214). Then, the user may modify the policy on that dataset to manage the replica copies. In alternative embodiments, the user may create a new dataset and specify one or more storage systems through the policy. Then the data orchestrator 210 creates one or more volumes on the one or more storage systems based on the policy. Thus, the primary dataset may be managed from existing or new datasets.

In addition, the policy includes placement and replication rules (e.g., source, target, mode, and interval), replication locations using location coordinates, replication modes (e.g., "ro" for read only and "rw" for read and write), replication frequency (e.g., for asynchronous replication), number of full replicas (full replicated datasets), system affinities, security rules (e.g., Access Control Lists (ACLs)), and governance rules (i.e., that describe where the replicated datasets may reside).

In certain embodiments, the placement and replication rules indicate the replication locations (e.g., source and target), the replication modes (e.g., "ro" for read only and "rw" for read and write), and the replication frequency (e.g., interval).

The system affinities set storage system preferences in the case of failures or storage capacity rebalancing. For example, there is a "hard" affinity that is strictly followed regardless of violating the policy, e.g. maintain 3 replica copies, while there is a "soft" affinity that is more flexible and attempts to maintain those storage system preferences as long as the policy isn't violated. For example, the user may set 3-way replica copies on systems A, B, and C. Then, the user may indicate that they want hard system affinities on storage systems A, B, C, and D. The data orchestrator 210 confines the replica copies to just those storage systems A, B, C, and D. If storage system C fails, then the data orchestrator 210 may make a replica on storage system D (but not on storage systems E, F, G, etc.). Suppose the user sets a soft affinity of A, B, and C. Then, if storage system C fails, the data orchestrator 210 may make a replica on storage system D. If and when storage system C is recovered, then the data orchestrator 210 moves the copy from storage system D back to storage system C.

Once the original dataset is created, the data orchestrator 210 attempts to create the volume on the storage system using an API or script and creates the other volumes and replicated datasets on other storage systems. The status and ability (or inability) to meet the policy is reported back. The data orchestrator 210 periodically scans each original dataset and the associated policy against what exists on the storage systems.

The user is able to modify the policy of the dataset using the declarative policy language at any time. Then during the periodic scans, the data orchestrator 210 automatically adjusts the replicated datasets according to the modified policy.

Figure 6:
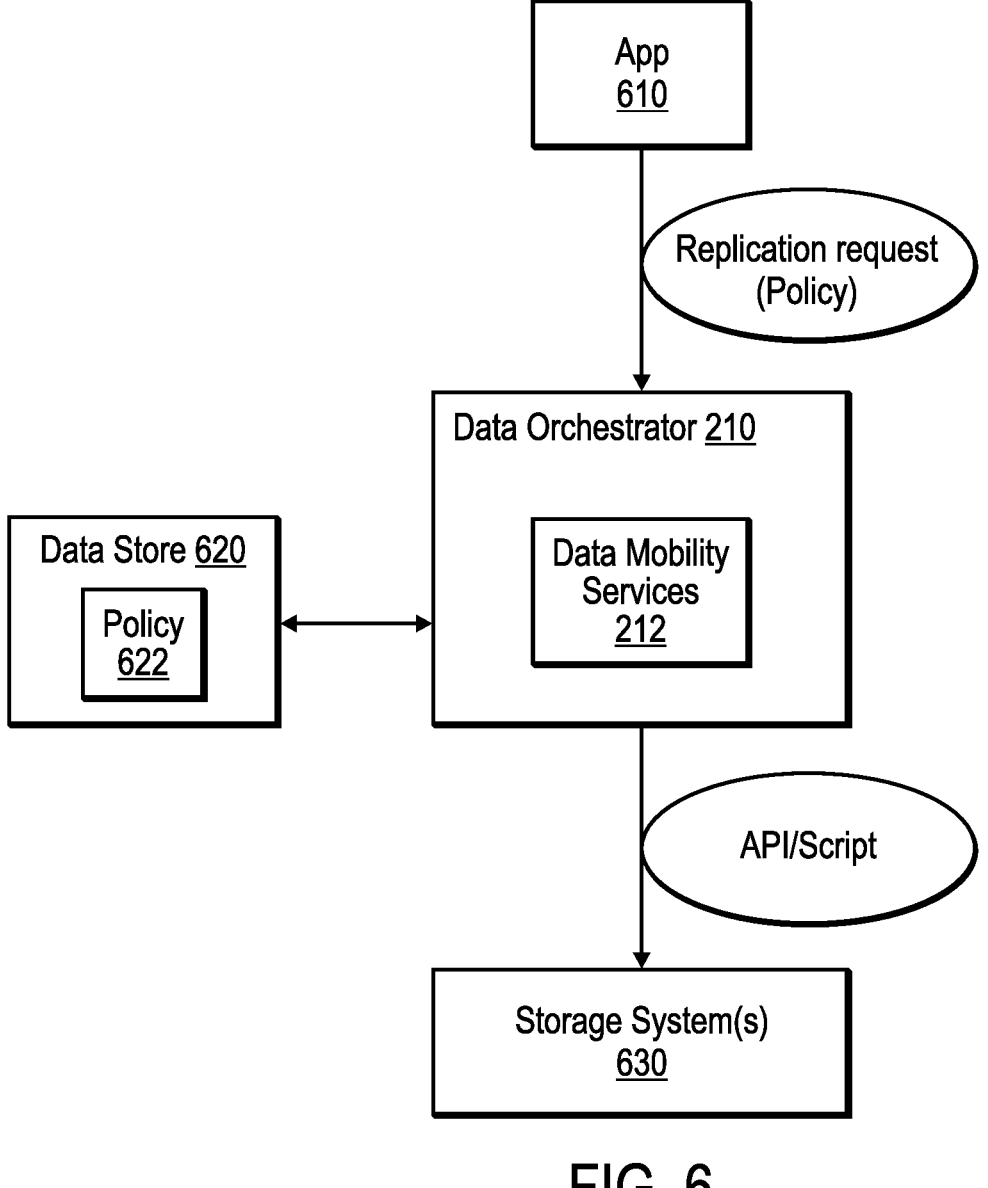
FIG. 6 illustrates another computing environment for the data orchestrator in accordance with certain embodiments.

FIG. 6 illustrates another computing environment for the data orchestrator in accordance with certain embodiments. Initially, an application (App) 610 receives (e.g., from a user) or generates (e.g., based on user input) a policy that uses the declarative policy language. The data orchestrator 210 receives a replication request that specifies the policy for an original dataset from the App 610. In certain embodiments, the App 610 issues an API request (i.e., an example of a replication request) to the data orchestrator, where the policy 622 is the payload of the API request.

The data orchestrator 210 stores the policy 622 in a data store 620 (e.g., a database). The data mobility services 212 of the data orchestrator 210 uses the policy 622 to create replicated datasets via an API or a script that is executed to create the replicated datasets on the one or more storage systems 630. A script may be described as a sequence of instructions or a program that may be executed to create a replicated dataset. In certain embodiments, the data mobility services 212 of the data orchestrator 210 generates the script based on the policy.

The data orchestrator 210 continuously monitors storage systems and enforces the data replication policy by performing dataset scans, creating new replicated datasets, editing existing replicated datasets, and deleting replicated datasets. These operations may be implemented using known data replication instructions with access to the one or more storage systems 630 via Hyper Text Transfer Protocol (HTTP) or SSH protocol. In certain embodiments, for editing, if the user modifies the replication frequency or access mode in the policy (e.g., changing from read-only to read-write mode), the data orchestrator 210 makes adjustments on each storage system specified in the policy.

Figure 7:
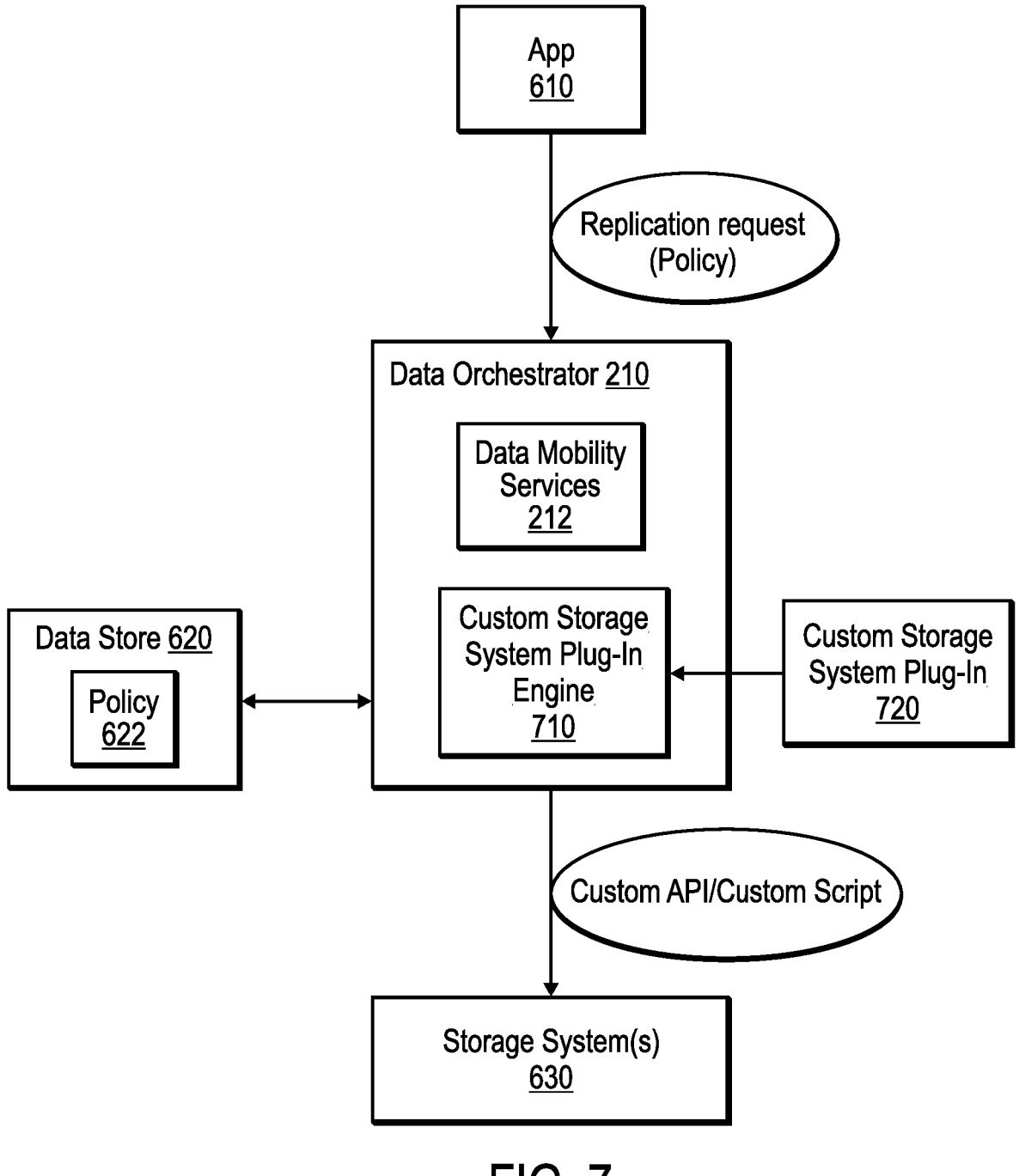
FIG. 7 illustrates yet another computing environment for the data orchestrator in accordance with certain embodiments.

FIG. 7 illustrates yet another computing environment for the data orchestrator 210 in accordance with certain embodiments. In FIG. 7, the data orchestrator 210 includes a custom storage system plug-in engine 710 that receives a custom storage system plug-in 720. The custom storage system plug-in 720 enables the data orchestrator 210 to manage custom storage systems because the custom storage system plug-in is a custom script, a custom API, etc. The data mobility services 212 of the data orchestrator 210 executes the custom storage system plug-in 720 to create the replicated datasets on the one or more storage systems 630.

In certain embodiments, the data orchestrator 210 automates data replication based on the declarative policy language by translating the policy into instructions (e.g., a non-custom script) for storage systems that are well-known (i.e., not custom) to the data orchestrator 210. In addition, for a custom storage system that is not well-known to the data orchestrator 210, the data orchestrator 210 uses a custom storage system plug-in to translate the policy into a custom set of instructions (e.g., a custom script) for the custom storage system.

FIG. 8 illustrates an example policy 800 in accordance with certain embodiments. In the policy 800, the name of the dataset is "blue-AI"; placement and replication rules indicate a source storage system, a target storage system, a replication mode, and an interval (i.e., a frequency); the number of full replicas is three; system affinities specify hard (s1, s2) and soft (s3) replicas; security rules specify which users may access (user 123, user xyz) the dataset and which users (user abc) may not access the dataset; and governance rules that specify the regions that may store the dataset (region-1 and region-2) and the regions that may not store the dataset (region-X).

Figure 9:
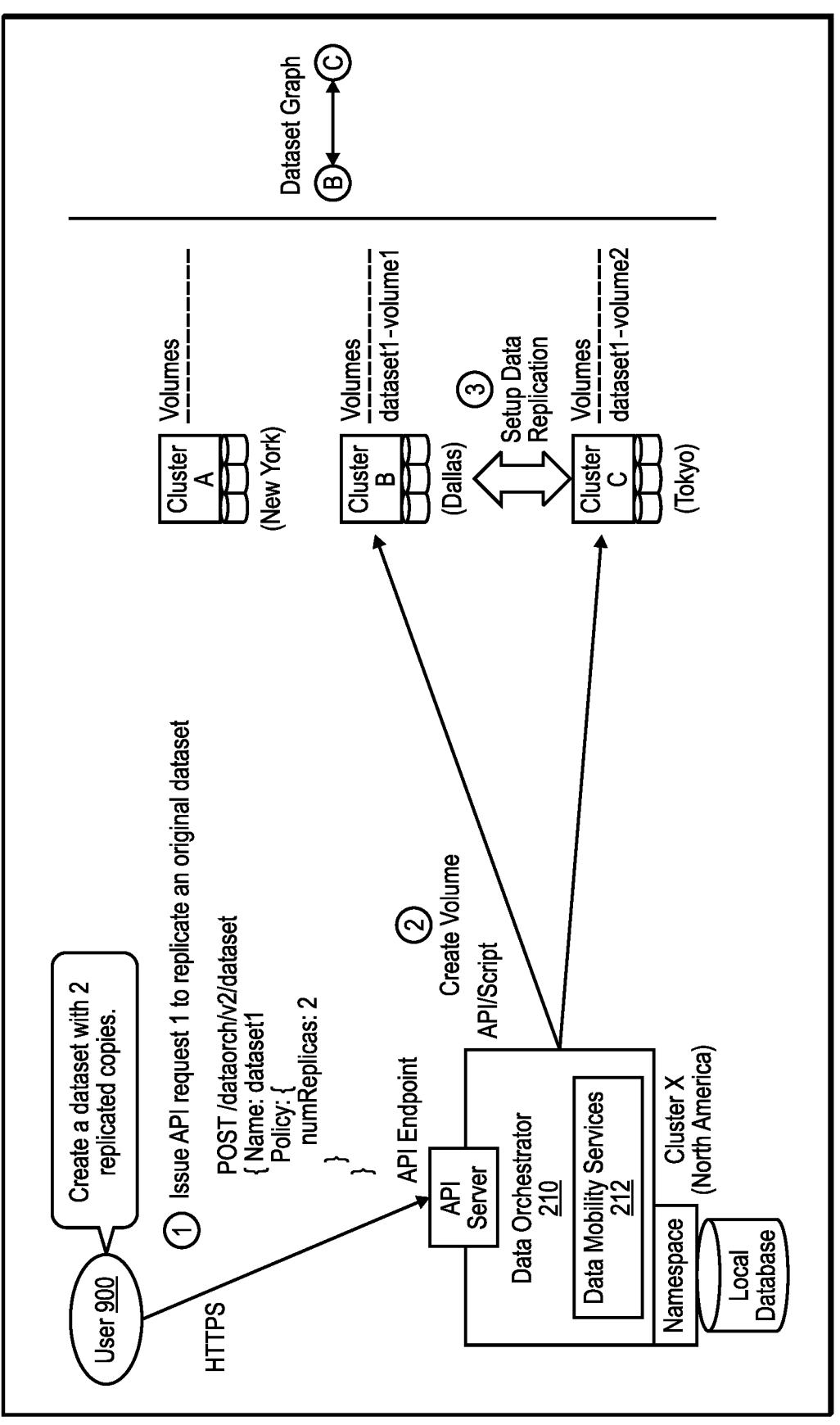
FIG. 9 illustrates an example of starting data replication in accordance with certain embodiments.

FIG. 9 illustrates an example of starting data replication in accordance with certain embodiments. A user 900 (e.g., an administrator, a development operator, an application developer or a data scientist) issues an API request to replicate an original dataset, with a name of "dataset1". Various clusters are shown in FIG. 9, and these may be described as storage systems. In certain embodiments, the data orchestrator 210 may store metadata describing the original dataset (without storing all of the data of the original dataset) in cluster X (e.g., in the local database). In addition, the data orchestrator 210 creates volumes on cluster B and cluster C. In certain embodiments, the data orchestrator 210 selects the clusters based on various factors, such as available capacity at the clusters, data locality for optimized access, other policies such as system affinities and data governance, etc. Then, the data orchestrator 210 replicates the original dataset so that one replicated dataset is stored on cluster B and another replicated dataset is stored on cluster C. In FIG. 9, the dataset graph shows that there is a relationship between clusters B and C since they both store replicated datasets of the original dataset. In certain embodiments, the data orchestrator 210 has access to a global namespace for data across the storage systems of an organization, and the data orchestrator 210 may use the global namespace to look up a dataset and any file or object within that dataset.

Figure 10:
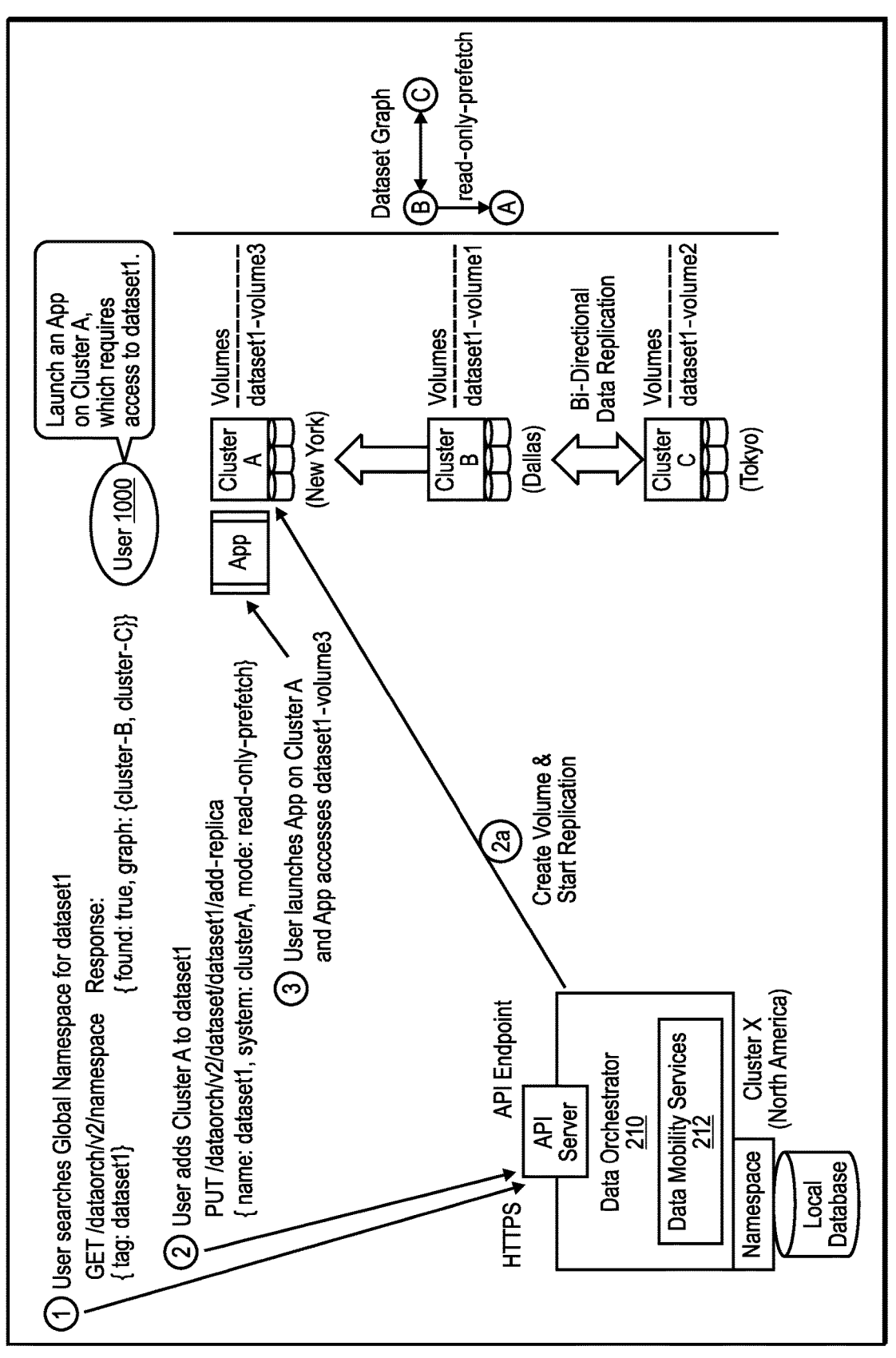
FIG. 10 illustrates another example of automated dataset optimization in accordance with certain embodiments.

FIG. 10 illustrates another example of automated dataset optimization in accordance with certain embodiments. In FIG. 10, a user 1000 wants to launch an App on Cluster A, which requires access to dataset1. The user 1000 searches the global namespace for dataset1 with "GET/dataorch/v2/namespace {tag: dataset1}" and receives a response of "{found: true, graph: {cluster-B, cluster-C}}", which means that dataset1 has been found and is replicated in cluster B and cluster C. Then, the user adds cluster A to dataset1 (with instruction: "PUT/dataorch/v2/dataset/dataset1/add-replica {name: dataset1, system: clusterA, mode: read-only-prefetch}"), and the data orchestrator 210 creates a volume on cluster A and creates a copy of dataset1 on cluster A. Next, the user launches the App on cluster A, and the App is able to access the replicated dataset1 on cluster A. In certain embodiments, the data orchestrator 210 determines that cluster B is closer in proximity to cluster A, so replication is set up from cluster B to cluster A (instead of from cluster C to cluster A). The dataset graph indicates that now a replicated dataset1 from cluster B to cluster A has been created.

Figure 11:
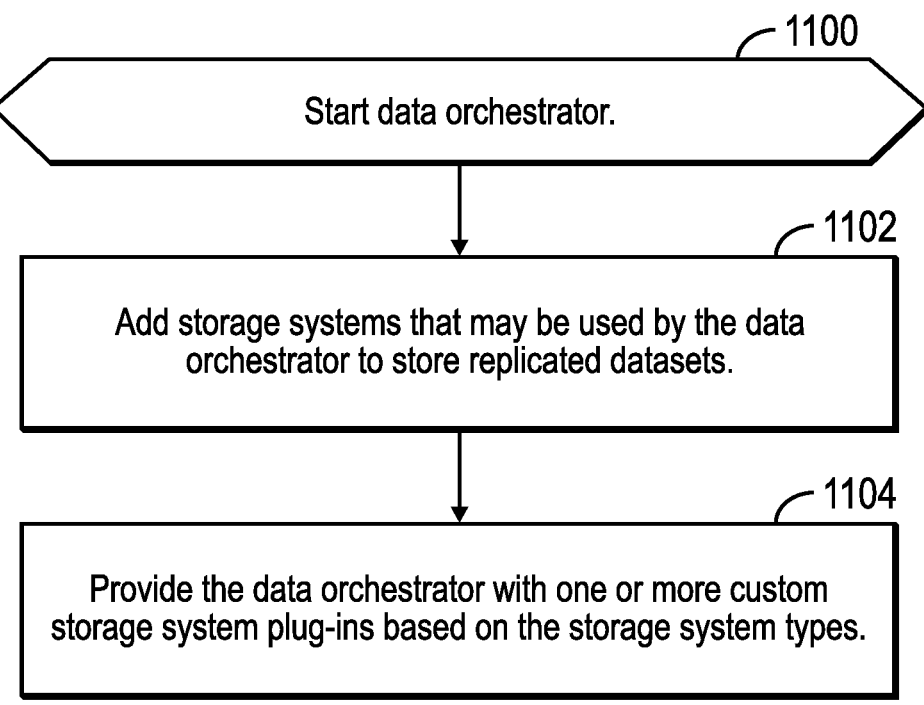
FIG. 11 illustrates, in a flowchart, operations by an application for initialization of storage systems in accordance with certain embodiments.

FIG. 11 illustrates, in a flowchart, operations by an application for initialization of storage systems in accordance with certain embodiments. Control begins at block 1100 with an application (e.g., in response to user input) starting the data orchestrator 210. In block 1102, the application adds storage systems that may be used by the data orchestrator to store replicated datasets. Adding the storage systems includes providing an IP hostname of each of the storage systems, credentials to access the storage systems, location coordinates (i.e., that specify locations) of the storage systems, and an indication of whether there is a custom storage system plug-in for the storage system. In block 1104, the application provides the data orchestrator 210 with one or more custom storage system plug-ins based on the storage system types. For example, for a custom storage system type, a custom storage system plug-in is provided that is able to communicate with the custom storage systems of that type. In certain embodiments, the custom storage system plug-in is able to convert the policy into custom instructions to the custom storage system to create a replicated dataset. In certain embodiments, a user (e.g., an administrator or development operator 220) performs the operations of FIG. 11 directly or indirectly by providing input to the application.

Figure 12:
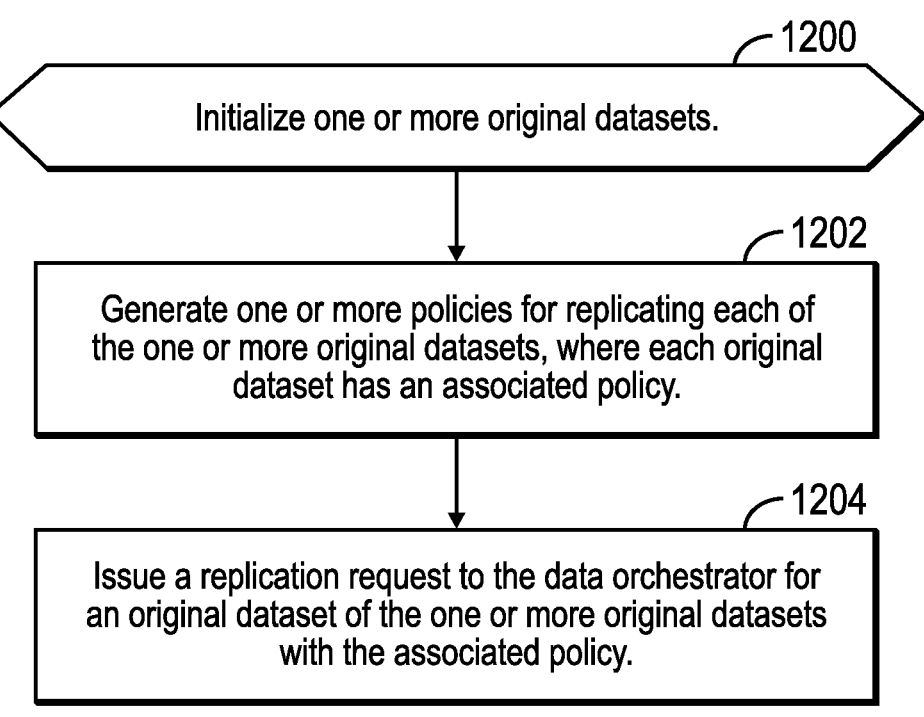
FIG. 12 illustrates, in a flowchart, operations by an application for replication of an original dataset in accordance with certain embodiments.

FIG. 12 illustrates, in a flowchart, operations by an application for replication of an original dataset in accordance with certain embodiments. Control begins at block 1200 with an application (e.g., in response to user input) initializing one or more original datasets. In block 1202, the application generates one or more policies for replicating each of the one or more original datasets, where each original dataset has an associated policy. In block 1204, the application issues a replication request to the data orchestrator for an original dataset of the one or more original datasets with the associated policy.

Figure 13:
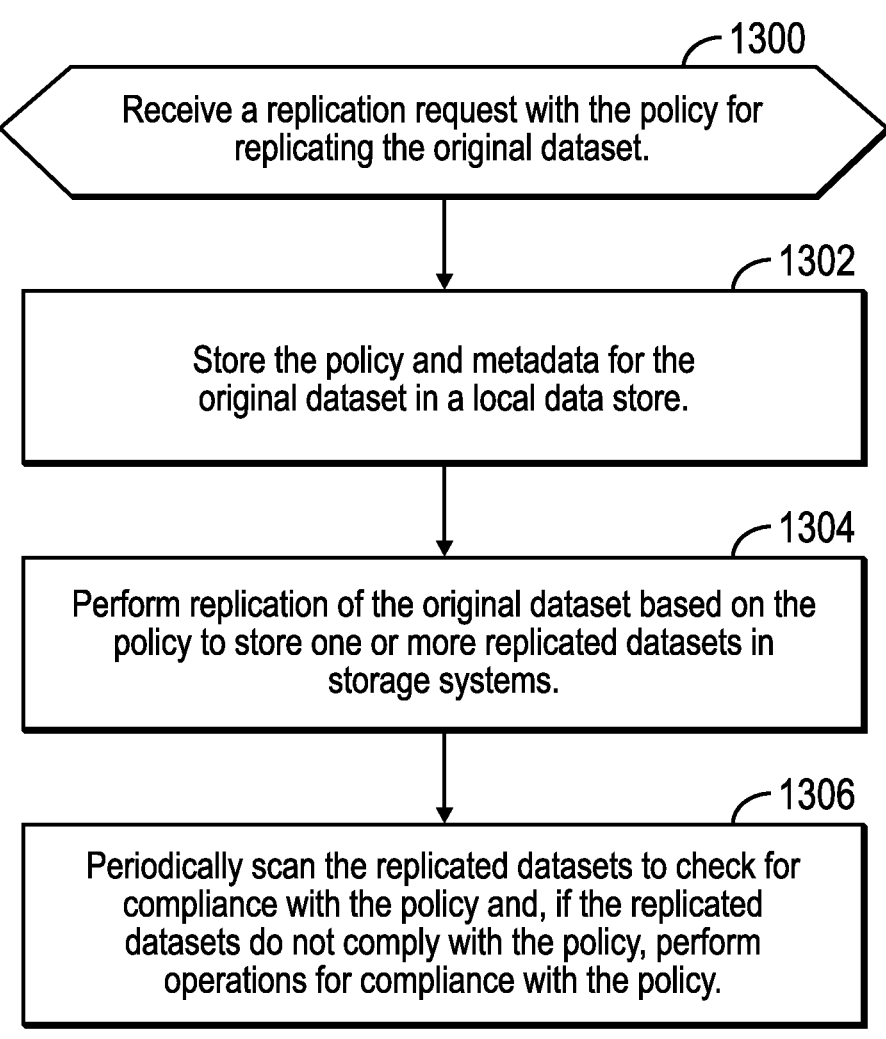
FIG. 13 illustrates, in a flowchart, operations by the data orchestrator for replicating the original dataset in accordance with certain embodiments.

FIG. 13 illustrates, in a flowchart, operations by the data orchestrator 210 for replicating the original dataset in accordance with certain embodiments. Control begins at block 1300 with the data orchestrator 210 receiving a replication request (e.g., an API request) with the policy for replicating the original dataset. In block 1302, the data orchestrator 210 stores the policy and metadata for the original dataset (and/or the original dataset) in a local data store (e.g., a local database). In block 1304, the data orchestrator 210 performs replication of the original dataset based on the policy to store one or more replicated datasets in storage systems (which may be selected based on the policy). In block 1306, the data orchestrator 210 periodically scans the replicated datasets to check for compliance with the policy and, if the replicated datasets do not comply with the policy, performs operations for compliance with the policy. For example, if there should be three replicated datasets, but one of the replicated datasets is on a storage system that is no longer available (e.g., due to a failure of the storage system, maintenance of the storage system, etc.), then another storage system is selected based on the policy and the replicated dataset is created on that storage system.

Figure 14:
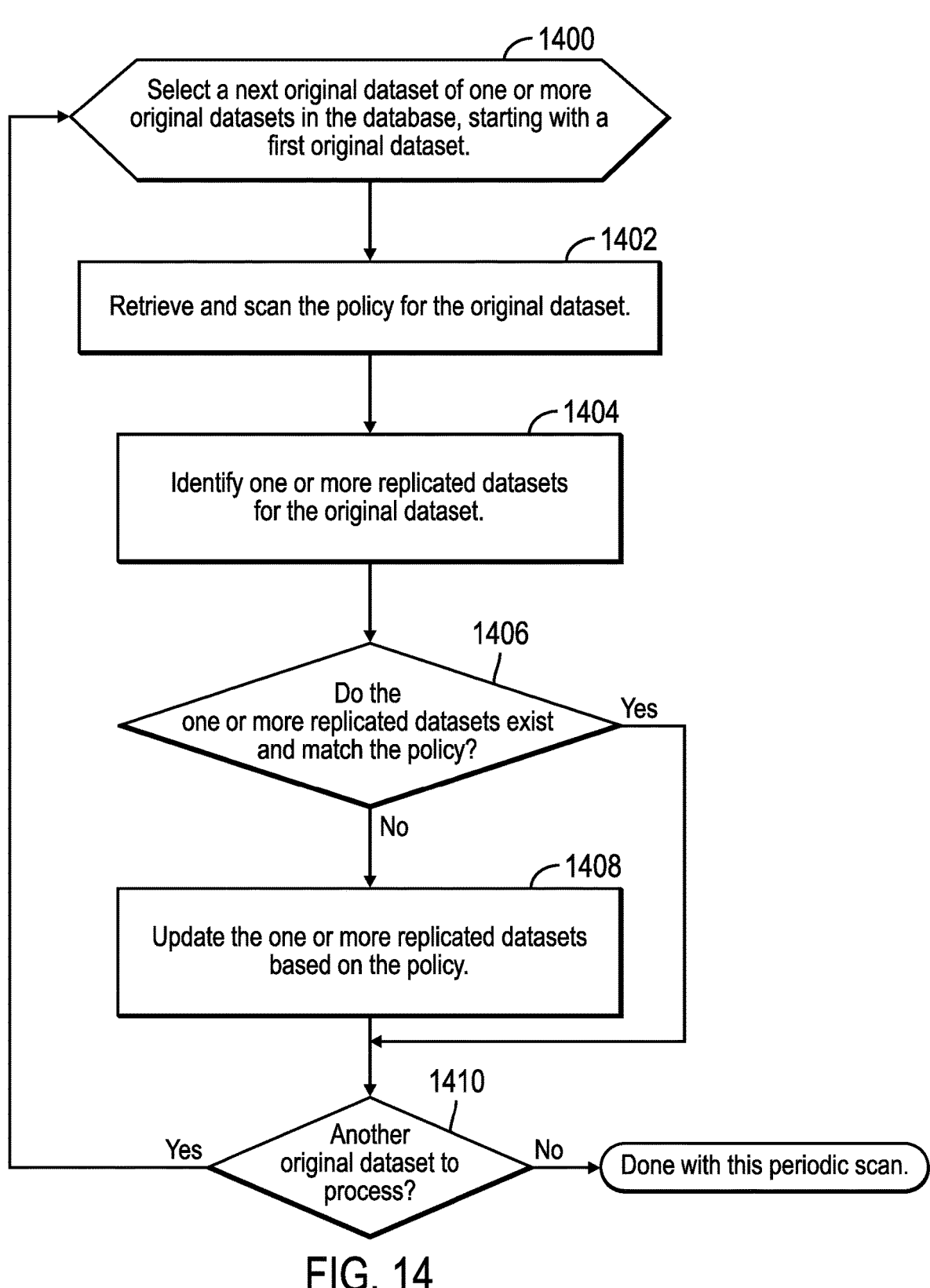
FIG. 14 illustrates, in a flowchart, operations by the data orchestrator for a periodic scan in accordance with certain embodiments.

FIG. 14 illustrates, in a flowchart, operations by the data orchestrator 210 for a periodic scan in accordance with certain embodiments. Control begins at block 1400, with the data orchestrator 210 selecting a next original dataset of one or more original datasets in the database, starting with a first original dataset. In block 1402, the data orchestrator 210 retrieves and scans the policy for the original dataset. In certain embodiments, the local database has a table of datasets that the data orchestrator 210 manages. The table row entry for each dataset references an entry in another table of policies that stores the policies. The data orchestrator 210 uses the table of datasets and the table of policies to retrieve the policy for a particular dataset.

In block 1404, the data orchestrator 210 identifies one or more replicated datasets for the original dataset. In block 1406, the data orchestrator 210 determines whether the one or more replicated datasets exist and match the policy. If so, processing continues to block 1410, otherwise, processing continues to block 1408.

In certain embodiments, the data orchestrator 210 also verifies the existence and state of storage systems using the API server or SSH interface. Depending on the storage system type, the data orchestrator may use API interfaces to verify existence and state of the storage system.

In block 1408, the data orchestrator 210 updates the one or more replicated datasets based on the policy. In certain embodiments, the policy has been updated by a user after the replicated datasets were created. For example, if fewer replicated datasets are requested in the updated policy, the data orchestrator 210 may delete a replicated dataset. As another example, if more replicated datasets are requested in the updated policy, the data orchestrator 210 may create another replicated dataset. Also, even if the policy has not been updated, but a replicated dataset does not exist (e.g., because it was stored on a storage system that is no longer available), the data orchestrator 210 may create another replicated dataset. Moreover, the data orchestrator 210 may modify the replication settings based on determining that current replication settings do not match the policy (e.g., because the policy has changed (e.g., the replication mode has been changed)).

In block 1410, the data orchestrator 210 determines whether there is another original dataset to process. If so, processing continues to block 1400 to select another dataset, otherwise, processing for this periodic scan is complete.

Figure 15:
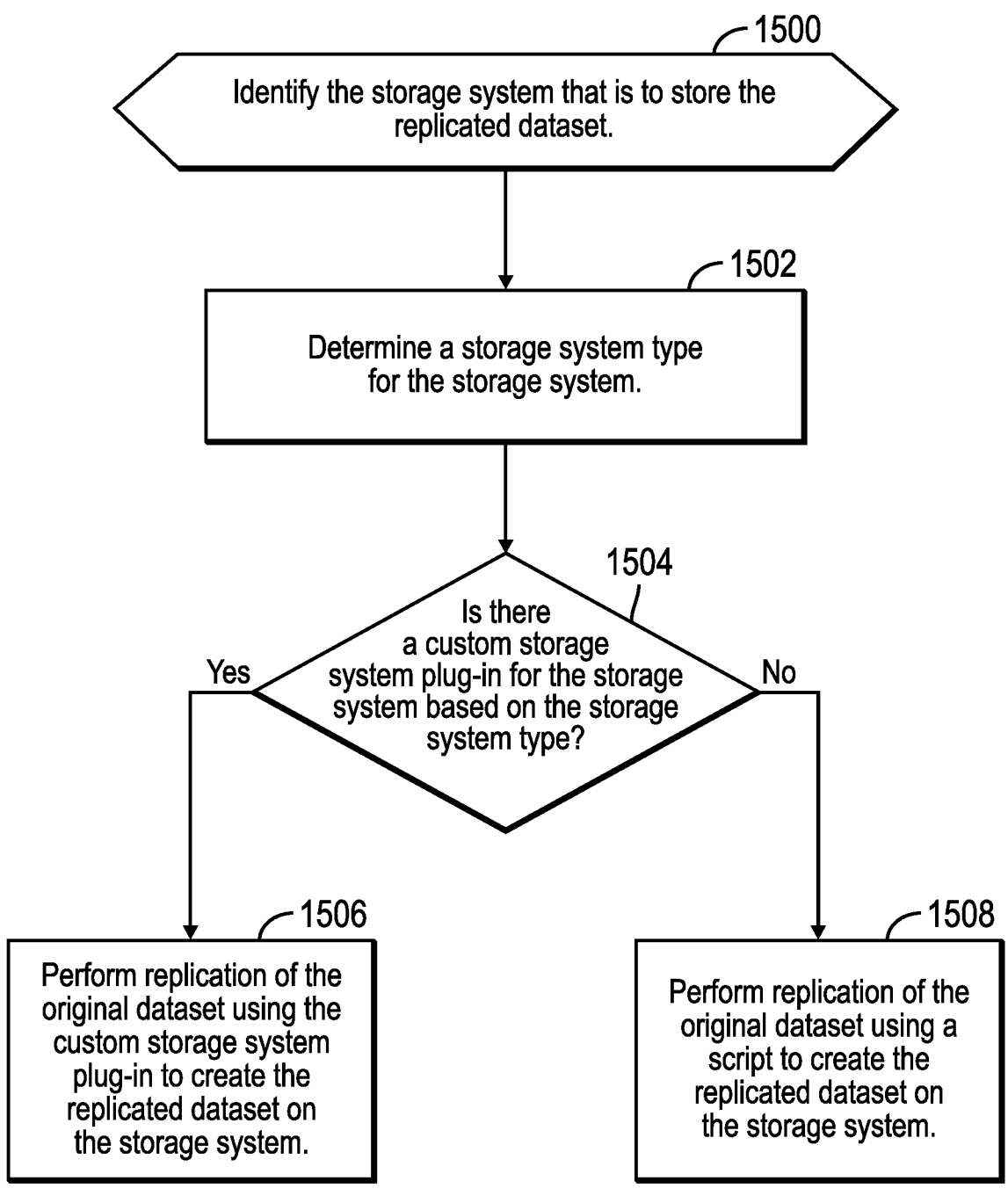
FIG. 15 illustrates, in a flowchart, operations by the data orchestrator for issuing instructions for replicating the original dataset in accordance with certain embodiments.

FIG. 15 illustrates, in a flowchart, operations by the data orchestrator 210 for issuing instructions for replicating the original dataset in accordance with certain embodiments. Control begins at block 1500 with the data orchestrator 210 identifying the storage system that is to store the replicated dataset.

In block 1502, the data orchestrator 210 determines the storage system type of the storage system. The storage system type may be a supported storage system type (i.e., a non-custom storage system type) that is not associated with a custom storage system plug-in or a custom storage system type that is associated with a custom storage system plug-in. In block 1504, the data orchestrator 210 determines whether there is a custom storage system plug-in for the storage system based on the storage system type. If so, processing continues to block 1506, otherwise, processing continues to block 1508.

In certain embodiments, the data orchestrator 210 is provided with a storage system type for a storage system, where the storage system type may be a supported storage system type or a custom storage system type. The custom storage system type indicates that a custom storage system plug-in is associated with the storage system.

In certain embodiments, the user (e.g., an administrator or development operator 220) identifies the storage system type using a drop down list that includes supported storage system types and a custom storage system type. The supported storage system types are supported by the data orchestrator 210 (i.e., the data orchestrator 210 knows how to communicate with those storage systems to perform actions on the storage systems without using a plug-in). However, the custom storage system type indicates that the data orchestrator 210 is to use a custom storage system plug-in to communicate with the storage system (i.e., a custom storage system). In certain embodiments, when the user selects the custom storage system type from the drop-down list, the user also specifies the custom storage system plug-in and the associated storage system. The custom storage system plug-in may be described as a set of instructions or commands to execute actions on the associated custom storage system, such as create volume, modify volume, delete volume, etc. For example, create volume may consist of a single POST request to URL/mgmt/v2/volume/xyz, where 'xyz' is the name of the volume to be created. The custom storage system plug-in may also describe the payload or body that is required with the REST API call. The custom storage system plug-in may consist of one or more commands, and the custom storage system plug-in may be one or more REST API commands, a list of commands to be issued by SSH, a script that may be executed, etc.

In block 1506, the data orchestrator 210 performs replication of the original dataset using the custom storage system plug-in to create the replicated dataset on the storage system. In certain embodiments, the data orchestrator 210 executes the custom storage system plug-in.

In block 1508, the data orchestrator 210 performs replication of the original dataset using a script to create the replicated dataset on the storage system. In certain embodiments, the data orchestrator 210 generates the script using the policy and executes the script.

FIG. 16 illustrates, in a flowchart, operations by the data orchestrator for replicating data in accordance with certain embodiments. Control begins at block 1600 with the data orchestrator 210 receiving a replication request and a policy for an original dataset to be replicated on one or more storage systems as one or more replicated datasets. In block 1602, the data orchestrator 210 selects a storage system of the one or more storage systems. In block 1604, the data orchestrator 210 determines a storage system type of the storage system. In block 1606, the data orchestrator 210 determines whether a custom storage system plug-in is associated with the storage system based on the storage system type. In block 1608, in response to determining that the custom storage system plug-in is associated with the storage system, the data orchestrator 210 executes the custom storage system plug-in to create a replicated dataset on the storage system. In block 1610, in response to determining that the custom storage system plug-in is not associated with the storage system, the data orchestrator 210 generates a script (i.e., a non-custom script) based on the policy and executes the script to create the replicated dataset on the storage system.

In certain embodiments, the data orchestrator 210 selects each storage system of the one or more storage systems and performs the operations of blocks 1604-1610.

In certain embodiments, the data orchestrator 210 stores the policy and metadata for the original dataset in a local data store.

In certain embodiments, the data orchestrator 210 receives an updated policy and automatically updates the one or more replicated datasets based on the updated policy by performing at least one of creating a new replicated dataset or deleting an existing replicated dataset of the one or more replicated datasets.

In certain embodiments, the data orchestrator 210 identifies the one or more storage systems from a plurality of storage systems based on a number of replicated datasets, available capacity at the one or more storage systems, and data locality of the one or more storage systems.

In certain embodiments, the data orchestrator 210 periodically scans the one or more replicated datasets to check for compliance with the policy, determines that a replicated dataset of the one or more replicated datasets is on a storage system of the one or more storage systems that is no longer available, and creates a new replicated dataset on another storage system of the one or more storage systems that is available.

In certain embodiments, the policy is created using a declarative policy language and comprises a number of replicated datasets of the original dataset to be made, replication locations, replication modes, replication frequency, system affinities, security rules, and governance rules.

In certain embodiments, the storage systems comprise any combination of edge nodes, cloud nodes, on-prem nodes, and file system nodes.

In certain embodiments, the data orchestrator 210 receives one or more storage systems and related information (e.g., hostname, IP for an associated API management server or SSH server, credentials, location coordinates, storage system type, etc.) associated with the one or more storage systems for management by the data orchestrator 210. The data orchestrator 210 verifies the existence of the one or more storage systems via the associated API management server or the SSH server.

The data orchestrator 210 supports a declarative policy for each dataset for the one or more storage systems with a declarative policy language (e.g., specifying a number of replicas, replication location, replication modes, and governance and security rules). The data orchestrator 210 automates data replication set up for the one or more systems utilizing the declarative policy language.

In addition, the data orchestrator 210 supports a custom storage system plug-in framework for the one or more systems utilizing the declarative policy language.

The data orchestrator 210 provides an efficient way to configure data replication across large and diverse network of systems, allows for unique workflows for each dataset push/pull data in any direction, and a simpler way to modify the workflows. For example, a dataset has full copies on storage systems B and C, so any modification to the copy on storage system B is automatically replicated to storage system C and vice versa (i.e., bi-directional replication is automatically done by the storage systems to keep the copies consistent with each other). Then, the user creates a new replica copy on storage system A that is a read-only copy and uses a prefetch technique known by the storage system. In other words, data flows from storage system B to storage system A, and not from storage system A to storage system B since storage system A read-only (and no new data is written by users to the copy on storage system A). Also, data is prefetched on-demand so this is not a full copy. In this example, the data workflow is setup and maintained by the data orchestrator 210 and is described by the policy using the declarative policy language. In addition, the data orchestrator 210 automatically adjusts to errors based upon declarative rules and policies (e.g., the policy is to maintain two replicas of data for redundancy and adjust in event of failure of one of the replicas).

The data orchestrator 210 simplifies management of data replication workflows across multiple data and storage systems (i.e., more than two systems). The data orchestrator 210 avoids manual configuration, and automatically updates replication when the state of available storage systems change. The data orchestrator 210 provides a dynamic solution and dynamically adapts to changing states within the storage systems (e.g., if one storage system is low on available capacity, the replicated dataset is automatically migrated to another storage system with more available capacity).

The data orchestrator 210 provides an overview of multiple systems. In certain embodiments, the local database may be described as providing the global view for the data orchestrator 210. The local database includes four tables: storage systems, datasets, volumes, and users. A dataset is defined as 1 to many volumes. Volumes are the replica copies of the dataset. In the storage systems, volumes may be file systems, file sets, buckets, etc. The local database has a global view of the state for these entities (storage systems, datasets, volumes, and users). This may include status or state of the storage system and volume, replication status between storage systems, etc. The APIs provided by the storage system typically allow the data orchestrator 210 to get status information about volume status and replication status. This may be stored in the local database, provided at a CLI or graphed in a GUI.

In certain embodiments, data orchestrator 210 performs point-to-point data replication (i.e., from the source system to the target system). The data orchestrator 210 creates two data or storage volumes (source and target volumes), initializing the source volume (at a source client via a CLI or WebApps/GUI, and initializing the target volume (at a target server via the CLI or WebApps/GUI). In certain embodiments, a dataset may have one volume and no replica copies, initially. A user may then modify the policy to create a second replica (at a second volume), and at that point, the data orchestrator 210 automates setting up replication from the source (first volume) to the target (second volume). The data orchestrator 210 applies replication settings based on the policy to make the replication bi-directional or unidirectional, etc. based on the settings as described by the declarative policy language.

In certain embodiments, the data orchestrator 210 performs replication in a Network File System (NFS). The data orchestrator 210 uses a Secure Shell (SSH) protocol into the target server (e.g., configure-nfs.sh, systemctl start nfs-server) and the SSH protocol into the source client (e.g., mount-t nfs-o rw TARGET:RPATH LPATH). This is an example of setting up a storage system type "NFS".

In certain embodiments, the data orchestrator 210 performs replication in a cloud environment or on-prem. The data orchestrator 210 uses SSH into a server (e.g., configure-server.sh, systemctl start server.service) and SSH into a storage system (e.g., mmafmcosconfig FS FSET-endpoint http://TARGET: PORT-mode sw-bucket BUCKET). This is an example of how to setup cache replica (NFS client) to a target (NFS server). The data orchestrator 210 may automate this setup for these storage system types.

In certain embodiments, data orchestrator 210 may work with a hybrid multi-cloud architecture, an edge computing architecture, and/or data manage and data mobility technologies. In certain embodiments, the data orchestrator 210 works with a wide range of data and storage system architectures, such as NFS, cloud systems, etc.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program instructions embodied therewith, the program instructions executable by a processor to cause the processor to perform operations for:

receiving a replication request and a policy that indicates a number of times an original dataset is to be replicated on a plurality of storage systems as a plurality of corresponding replicated datasets, wherein at least one storage system of the plurality of storage systems is a custom storage system type and at least another storage system of the plurality of storage systems is a non-custom storage system type; and for each storage system of the plurality of storage systems and a corresponding replicated dataset of the plurality of corresponding replicated datasets, in response to determining that the storage system is the custom storage system type, executing a custom storage system plug-in associated with the storage system to generate a custom script by translating the policy into a custom set of instructions; and executing the custom script to create the corresponding replicated dataset on the storage system; and in response to determining that the storage system is the non-custom storage system type, generating a non-custom script by translating the policy into a non-custom set of instructions; and executing the non-custom script to create the corresponding replicated dataset on the storage system.

2. The computer program product of claim 1, wherein the program instructions are executable by the processor to cause the processor to perform further operations for:

storing the policy and metadata for the original dataset in a local data store.

3. The computer program product of claim 1, wherein the program instructions are executable by the processor to cause the processor to perform further operations for:

receiving an updated policy that indicates another number of times the original dataset is to be replicated;

determining that the number of times the original dataset is to be replicated in the policy does not match another number of times the original dataset is to be replicated in the updated policy; and automatically updating the plurality of corresponding replicated datasets based on the updated policy by performing at least one of creating a new replicated dataset and deleting an existing replicated dataset by generating at least one new script by translating the updated policy into a new set of instructions.

4. The computer program product of claim 1, wherein the program instructions are executable by the processor to cause the processor to perform further operations for:

identifying the plurality of storage systems based on the number of times the original dataset is to be replicated, available capacity at the plurality of storage systems, and data locality of the plurality of storage systems.

5. The computer program product of claim 1, wherein the program instructions are executable by the processor to cause the processor to perform further operations for:

periodically scanning the plurality of corresponding replicated datasets to check for compliance with the policy;

determining that a replicated dataset of the plurality of corresponding replicated datasets is on a storage system of the plurality of storage systems that is no longer available; and creating a new replicated dataset on another storage system of the plurality of storage systems that is available.

6. The computer program product of claim 1, wherein the policy is created using a declarative policy language and comprises the number of times the original dataset is to be replicated, replication locations, replication modes, replication frequency, system affinities, security rules, and governance rules.

7. The computer program product of claim 1, wherein the storage systems comprise any combination of edge nodes, cloud nodes, on-prem nodes, and file system nodes.

8. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

receiving a replication request and a policy that indicates a number of times an original dataset is to be replicated on a plurality of storage systems as a plurality of corresponding replicated datasets, wherein at least one storage system of the plurality of storage systems is a custom storage system type and at least another storage system of the plurality of storage systems is a non-custom storage system type; and for each storage system of the plurality of storage systems and a corresponding replicated dataset of the plurality of corresponding replicated datasets, in response to determining that the storage system is the custom storage system type, executing a custom storage system plug-in associated with the storage system to generate a custom script by translating the policy into a custom set of instructions; and executing the custom script to create the corresponding replicated dataset on the storage system; and in response to determining that the storage system is the non-custom storage system type, generating a non-custom script by translating the policy into a non-custom set of instructions; and executing the non-custom script to create the corresponding replicated dataset on the storage system.

9. The computer system of claim 8, wherein the program instructions perform further operations comprising:

storing the policy and metadata for the original dataset in a local data store.

10. The computer system of claim 8, wherein the program instructions perform further operations comprising:

receiving an updated policy that indicates another number of times the original dataset is to be replicated;

determining that the number of times the original dataset is to be replicated in the policy does not match another number of times the original dataset is to be replicated in the updated policy; and automatically updating the plurality of corresponding replicated datasets based on the updated policy by performing at least one of creating a new replicated dataset and deleting an existing replicated dataset by generating at least one new script by translating the updated policy into a new set of instructions.

11. The computer system of claim 8, wherein the program instructions perform further operations comprising:

identifying the plurality of storage systems based on the number of times the original dataset is to be replicated, available capacity at the plurality of storage systems, and data locality of the plurality of storage systems.

12. The computer system of claim 8, wherein the program instructions perform further operations comprising:

periodically scanning the plurality of corresponding replicated datasets to check for compliance with the policy;

determining that a replicated dataset of the plurality of corresponding replicated datasets is on a storage system of the plurality of storage systems that is no longer available; and creating a new replicated dataset on another storage system of the plurality of storage systems that is available.

13. The computer system of claim 8, wherein the policy is created using a declarative policy language and comprises the number of times the original dataset is to be replicated, replication locations, replication modes, replication frequency, system affinities, security rules, and governance rules.

14. The computer system of claim 8, wherein the storage systems comprise any combination of edge nodes, cloud nodes, on-prem nodes, and file system nodes.

15. A computer-implemented method, comprising operations for:

receiving a replication request and a policy that indicates a number of times an original dataset is to be replicated on a plurality of storage systems as a plurality of corresponding replicated datasets, wherein at least one storage system of the plurality of storage systems is a custom storage system type and at least another storage system of the plurality of storage systems is a non-custom storage system type; and for each storage system of the plurality of storage systems and a corresponding replicated dataset of the plurality of corresponding replicated datasets, in response to determining that the storage system is the custom storage system type, executing a custom storage system plug-in associated with the storage system to generate a custom script by translating the policy into a custom set of instructions; and executing the custom script to create the corresponding replicated dataset on the storage system; and in response to determining that the storage system is the non-custom storage system type, generating a non-custom script by translating the policy into a non-custom set of instructions; and executing the non-custom script to create the corresponding replicated dataset on the storage system.

16. The computer-implemented method of claim 15, further comprising operations for:

storing the policy and metadata for the original dataset in a local data store.

17. The computer-implemented method of claim 15, further comprising operations for:

receiving an updated policy that indicates another number of times the original dataset is to be replicated;

determining that the number of times the original dataset is to be replicated in the policy does not match another number of times the original dataset is to be replicated in the updated policy; and automatically updating the plurality of corresponding replicated datasets based on the updated policy by performing at least one of creating a new replicated dataset or deleting an existing replicated dataset by generating at least one new script by translating the updated policy into a new set of instructions.

18. The computer-implemented method of claim 15, further comprising operations for:

identifying the plurality of storage systems based on the number of times the original dataset is to be replicated, available capacity at the plurality of storage systems, and data locality of the plurality of storage systems.

19. The computer-implemented method of claim 15, further comprising operations for:

periodically scanning the plurality of corresponding replicated datasets to check for compliance with the policy;

determining that a replicated dataset of the plurality of corresponding replicated datasets is on a storage system of the plurality of storage systems that is no longer available; and creating a new replicated dataset on another storage system of the plurality of storage systems that is available.

20. The computer-implemented method of claim 15, wherein the policy is created using a declarative policy language and comprises the number of times the original dataset is to be replicated, replication locations, replication modes, replication frequency, system affinities, security rules, and governance rules.

* * * * *